Aug. 25, 1970   P. JOBMANN   3,525,120
METHOD FOR PRODUCING BONE-FREE FISH FILLETS
Filed May 1, 1967   2 Sheets-Sheet 1

INVENTOR
Paul JOBMANN
BY
Raymond A. Robic
ATTORNEY

United States Patent Office 3,525,120
Patented Aug. 25, 1970

3,525,120
METHOD FOR PRODUCING BONE-FREE FISH FILLETS
Paul Jobmann, Lubeck, Germany, assignor to Nordischer Maschinenbau Rud. Baader, Lubeck, Germany
Filed May 1, 1967, Ser. No. 635,079
Claims priority, application Germany, Apr. 29, 1966, N 28,469
Int. Cl. A22c 25/16
U.S. Cl. 17—46      1 Claim

ABSTRACT OF THE DISCLOSURE

A method of producing fish fillets that are substantially free of pin-bones wherein the belly cavity is cut open to form opposed belly flaps that are severed from the back of the fish with the pin-bones by making a single inclined incision on each side of the fish, the incisions subtending an obtuse angle between them as seen from the back of the fish and extending to the side of the pin-bones nearest the back of the fish. These incisions first extend parallel to said back bone and then, from the end of the belly cavity, obliquely toward the anus of the fish to thus remove the belly flaps while containing the pin-bones.

---

The present invention relates to a method and to a device for the production of fish fillets that are free from bones, also known as meat bones or pin bones.

In the production of fish fillets by machine, the meat portions are cut off from the spines, the vertebrae and the ribs while the fishbones or meat bones remain in the fillets. Attempts to remove the fishbones from the fillets by machine, after fillets by machine, after filleting, have been unsuccessful.

In one method of mechanically producing fin-free fillets, the portions of the belly flaps containing the ventral and pectoral fins are separated through a curve-shaped cut. To save trimming and checking, another method separates the belly flaps by a cut that extends from the anus to behind the pectoral fins. The latter method is used particularly aboard boats equipped for both fish catching and dressing where, for the sake of cutting down on the labor costs, there is a considerable loss in yield. The only suitable method for obtaining fish fillets free of fish bones is by cutting out the meat strip containing the fishbones, before filleting. In the search for means to produce fish fillets free of fishbones with known filleting machines, it has been discovered that such fish fillets free of fishbones may be produced by separating the fishbone zone together with the belly flaps.

The present invention therefore relates to a method for the mechanical production of fish fillets that are substantially free of pin-bones, the method being characterized by cutting the belly cavity open to form opposed flaps; severing the flaps from the back of the fish with the pin-bones by making a single inclined incision on each side of the fish, the incisions subtending an obtuse angle between them as seen from the back of the fish and extending to the side of the pin-bones nearest the back of the fish. The incisions first extend parallel to the back bone and then, from the end of the belly cavity, obliquely toward the anus of the fish whereby to remove the belly flaps while containing the pin-bones.

The method according to the invention would not, a few years ago, have been given much chance of success because of the decreased yield. However, it has proved quite acceptable in experimentations carried on board fishing boats because the fillets are then bone-free and may thus sell at a higher price. Further advantages have also become apparent due to the fact that the resulting fillets need not be trimmed nor inspected after filleting. Both these operations must be carried out very carefully and are therefore time-consuming. Furthermore, the necessary conditions for carrying out these operations are generally not found on board ships.

The invention will now be described in relation to the following description of a preferred embodiment having reference to the appended drawings wherein.

Figure 1:
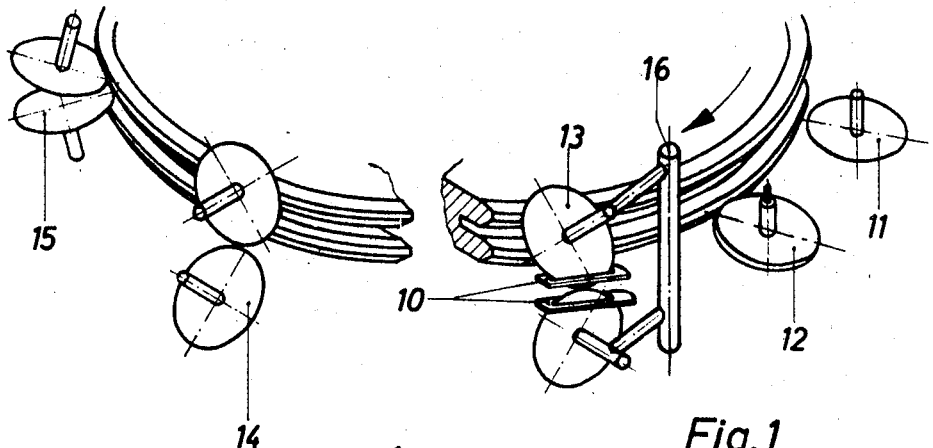
FIG. 1 is a perspective view of the tools necessary for carrying out the method of the invention.
Figure 2:
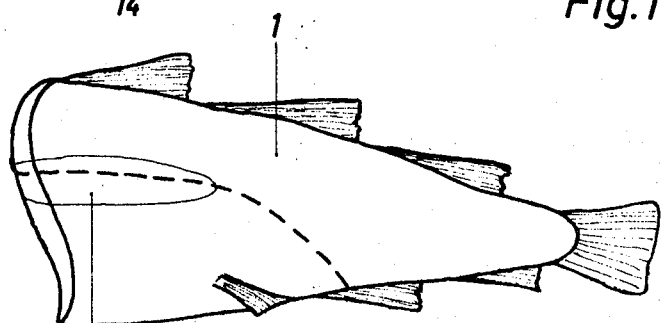
FIG. 2 is a side elevation view of a fish illustrating the cut.
Figure 3:
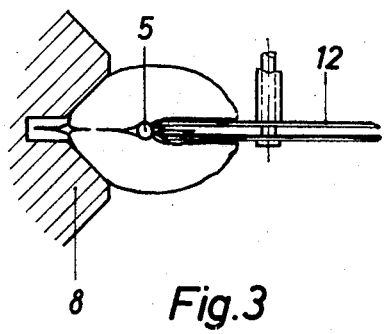
FIG. 3 is a cross-section through the tail portion of the fish.

In the filleting machine schematically illustrated in FIG. 1, the beheaded fish 1 (FIG. 2) is seized by the tail and is conveyed in the direction of the arrow with its back lying against and in a channel 8 (see FIGS. 3 and 4) mounted in a circular path with the belly side turned outward. Dressing tools are provided along the circular path of channel 8, the said tools being controlled in known manner and according to the size of the fish. The belly cavity is opened by means of a circular knife 11. The back bone 5, in the tail portion of the fish, is cut loose by a pair of parallel belly filleting knives 12 (FIG. 3). The tools immediately following the belly filleting knives 12 are the fish bone knives 13. Further on, rib knives 14 and back filleting knives 15 are provided.

Figure 4:
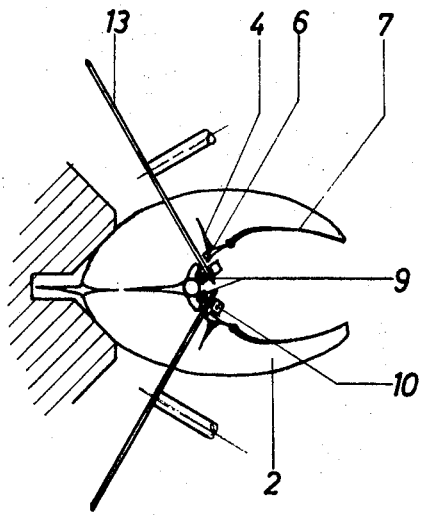
FIG. 4 is a cross-section through the belly cavity of the fish when cutting off the fishbones.

The fishbone knives 13 (FIG. 4) differ from the known belly flap cutter or filleting knives in that they do not lie in a plane but are inclined in relation to one another so as to form an obtuse angle toward the back of the fish. The distance between the edges of the knives 13 is just sufficient to allow passage of the back bone 5. Cutting supports 10 are provided in such a manner as to define a kind of knife guiding elements 9 (FIG. 4).

In carrying out the method, a beheaded fish 1 is seized by its tail and is led past the belly slitting knife 11 which opens the belly cavity to allow ejection of the bowels. When the back bone 5, in the tail portion of the fish, has been cut loose by the belly filleting knives 12 as shown in FIG. 3, the fishbone knives 13 cut into the fish at the end of the belly cavity and remove the belly flaps 2 together with the fishbones 4 and vertebrae 6 lying substantially in zone 3, as well as the belly bones 7. This is done in a most simple manner because when the fish bone knives 13 cut into the fish at the end of the belly cavity, the guiding elements 9 are supported inside the belly cavity by the dorsal vertebrae and slide along them.

The rib knives 14 and the back filleting knives 15 thereafter cut the fillets, in known manner, from the skeleton of the fish.

Controlling may be carried out in known manner, for instance, by means of a controlling device provided with curves adjusted according to the size of the fish, on the basis of a fish measuring.

Figure 5:
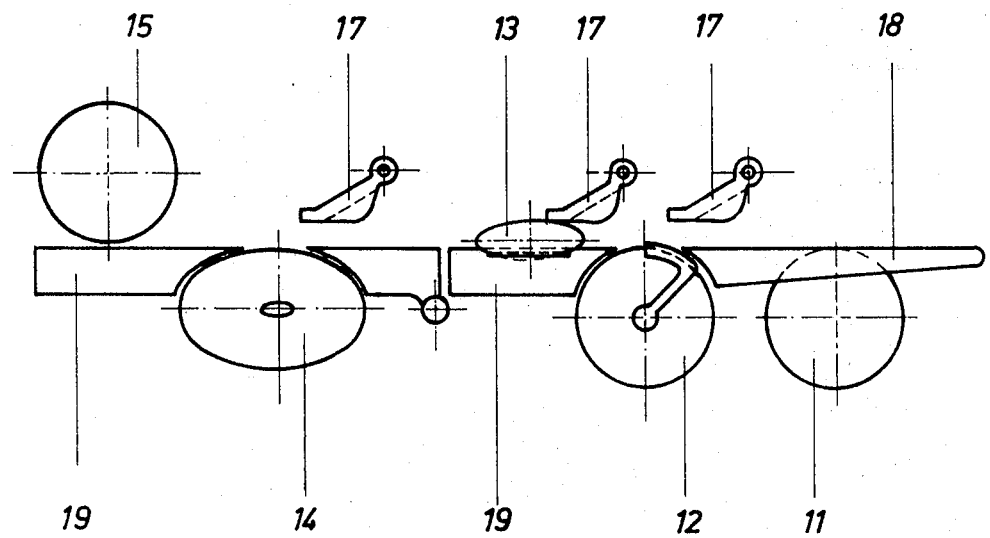
FIG. 5 is a diagram of the two arrangements for carrying out the method and wherein the fish is conveyed in a straight line.

Variations may be brought to the above described method without departing from the spirit of the invention. For instance, the fish may be conveyed along a straight path, as illustrated in FIG. 5 wherein are shown the belly cavity guides 18, 19 and the measuring feelers 17 for measuring the fish and controlling the tools and guides, as are known in machines of this type.

I claim:
1. The method of producing bone-free fish fillets, which comprises cutting open the belly cavity of a headless fish body by a cut extending parallel to the direction of the fish body to eject the bowels, providing two parallel cuts also extending in the direction of the fish body within the belly cavity which cut loose the backbone in the tail portion of the fish, whereby opposed belly flaps are formed, cutting off said belly flaps by two opposed cuts extending at an obtuse angle to each other and directed to the bottom of the belly cavity along said backbone and behind the anus, said two opposed cuts being controlled by the lower edges of the dorsal vertebrae and removing belly flaps along with the pinbones, vertebrae and the belly bones, and then cutting off the fillets from the skeleton of the fish.

References Cited

UNITED STATES PATENTS

| | | | |
|---|---|---|---|
| 2,704,378 | 3/1955 | Schlitchting | 17—4 |
| 2,857,621 | 10/1958 | Schlitchting | 17—45 |
| 3,309,730 | 3/1967 | Michael | 17—4 |
| 3,319,287 | 5/1967 | Michael | 17—45 |

LUCIE H. LAUDENSLAGER, Primary Examiner

U.S. Cl. X.R.

17—57